US012612937B2

(12) United States Patent
Molinelli et al.

(10) Patent No.: US 12,612,937 B2
(45) Date of Patent: Apr. 28, 2026

---

(54) ACTUATOR LOCK NUT ASSEMBLY

(71) Applicant: Microtecnica S.r.l., Turin (IT)

(72) Inventors: Dario Molinelli, Carnate (IT); Franco Maino, Brugherio (IT); Michele Restuccia, Milan (IT)

(73) Assignee: MICROTECNICA S.R.L., Turin (IT)

( * ) Notice: Subject to any disclaimer, the term of this patent is extended or adjusted under 35 U.S.C. 154(b) by 141 days.

(21) Appl. No.: 18/308,931

(22) Filed: Apr. 28, 2023

(65) Prior Publication Data

US 2023/0358267 A1 Nov. 9, 2023

(30) Foreign Application Priority Data

May 3, 2022 (EP) .................................... 22171466

(51) Int. Cl.
| | |
|---|---|
| *F16B 39/10* | (2006.01) |
| *B64C 27/12* | (2006.01) |
| *F16B 39/14* | (2006.01) |
| *F16B 39/26* | (2006.01) |

(52) U.S. Cl.
CPC .............. *F16B 39/14* (2013.01); *B64C 27/12* (2013.01); *F16B 39/26* (2013.01)

(58) Field of Classification Search
CPC ................................. F16B 39/10; F16B 39/08
USPC .......................... 411/116, 122–124, 127–128
See application file for complete search history.

(56) References Cited

U.S. PATENT DOCUMENTS

| | | | | | |
|---|---|---|---|---|---|
| 574,548 | A | * | 1/1897 | Lewis | ...................... F16B 39/10 |
| | | | | | 411/128 |
| 798,996 | A | * | 9/1905 | Dyer | ........................ F16B 39/10 |
| | | | | | 411/948 |
| 1,984,244 | A | * | 12/1934 | Wilson | .................... F16B 39/32 |
| | | | | | 411/979 |
| 2,016,343 | A | * | 10/1935 | Oberem | .................. F16H 48/08 |
| | | | | | 475/230 |
| 2,031,878 | A | * | 2/1936 | Alfred | ................... F16L 27/073 |
| | | | | | 411/116 |
| 2,332,684 | A | * | 10/1943 | Armitage | ................ F16C 25/06 |
| | | | | | 403/370 |
| 2,546,969 | A | * | 4/1951 | Buckendale | .......... F16H 57/037 |
| | | | | | 475/230 |

(Continued)

FOREIGN PATENT DOCUMENTS

EP 0864768 A1 9/1998

OTHER PUBLICATIONS

Abstract for EP0864768 (A1), Published: Sep. 16, 1998, 1 page.
European Search Report Application No. 22171466.0, mailed Oct. 19, 2022, 7 pages.

*Primary Examiner* — Flemming Saether
(74) *Attorney, Agent, or Firm* — CANTOR COLBURN LLP

(57) ABSTRACT

A lock nut assembly for an actuator, the lock nut assembly comprising a nut configured to be mounted to a bracket of the actuator for axial movement relative to the bracket, and a lock nut retaining and release mechanism configured to be fixedly mounted to the bracket and axially movable between a first engaged position in which the lock nut retaining and release mechanism engages with the nut to prevent rotation of the nut and a second unlocked position in which the lock nut retaining and release mechanism is not engaged with the nut and the nut can be rotated relative to the bracket.

14 Claims, 5 Drawing Sheets

(56)                    References Cited

U.S. PATENT DOCUMENTS

| | | | | |
|---|---|---|---|---|
| 3,261,230 A * | 7/1966 | William | .................. | F16H 48/22 |
| | | | | 192/89.22 |
| 3,625,632 A | 12/1971 | Casterline | | |
| 3,851,690 A * | 12/1974 | Wing | ...................... | F16B 39/10 |
| | | | | 411/948 |
| 4,113,227 A * | 9/1978 | Cigliano | ................. | F16L 55/10 |
| | | | | 411/116 |
| 4,534,101 A * | 8/1985 | Rosan, Jr. | ............... | F16B 39/10 |
| | | | | 29/259 |
| 4,976,576 A * | 12/1990 | Mahaney, Jr. | .......... | F16B 39/10 |
| | | | | 411/129 |
| 5,269,731 A * | 12/1993 | Scudder | .................. | F16C 19/54 |
| | | | | 74/606 R |
| 5,297,934 A | 3/1994 | Desjardins | | |
| 7,485,065 B2 * | 2/2009 | Kearney | ................. | F16H 48/08 |
| | | | | 384/537 |
| 7,794,153 B2 * | 9/2010 | Szczepanski | ........... | B60B 35/18 |
| | | | | 384/562 |
| 8,534,770 B2 * | 9/2013 | White | ..................... | F16C 25/06 |
| | | | | 301/105.1 |
| 8,616,780 B2 * | 12/2013 | Kwasniewski | ......... | F16C 25/06 |
| | | | | 384/473 |
| 8,777,493 B2 * | 7/2014 | Kwasniewski | ....... | F16H 57/022 |
| | | | | 384/585 |
| 9,683,596 B2 | 6/2017 | Hughes et al. | | |
| 10,001,029 B2 * | 6/2018 | Carter | .................. | F01D 25/162 |
| 2020/0200209 A1 | 6/2020 | Coyne et al. | | |

* cited by examiner

- Prior Art -

- Prior Art -

- Prior Art -

ACTUATOR LOCK NUT ASSEMBLY

CROSS-REFERENCE TO RELATED APPLICATIONS

This application claims priority to European Patent Application No. 22171466.0 filed May 3, 2022, the entire contents of which is incorporated herein by reference.

TECHNICAL FIELD

The present disclosure is concerned with a lock nut assembly for an actuator such as a servo actuator for a rotor of a helicopter.

BACKGROUND

Actuators are used in many fields to transfer movement from a drive to an object or surface to be moved. There are many types of actuator including linear actuators that convert rotary movement to linear movement, rotary actuators that cause rotation of the object or surface to be moved. Actuators may be hydraulically controlled, electrically controlled, mechanically controlled or a combination thereof. A servo actuator has a servo motor to drive rotation of the actuator rod.

An actuator has an actuator rod which is rotated by the drive and which is connected to the object or surface to be moved. The rod may include an inner and an outer rod which are in operative engagement such that one of the inner and outer rods is rotated by the drive and causes the other of the inner and outer rod, which is connected to the object or surface to be moved, to either rotate (for a rotary actuator) or move linearly (for a linear actuator) according to the desired movement of the object/surface.

One use of an actuator is in a helicopter. The helicopter tail rotor and the main rotor are control by means of actuators which cause rotation of the rotor and actuators are also used to vary the pitch of the rotor blade.

Actuators include various fasteners or nuts for fastening and positioning the actuator components relative to each other. These nuts have specific torques designed to distributed loads as designed by the manufacturer. With use, the nuts can loosen and their torque needs to be regularly checked and the nuts need to be tightened if they have loosened to ensure the required torque is maintained. In an actuator used to control a helicopter rotor, for example, a lock nut designed to define a break-away torque of a ball bearing between the actuator rod and a housing or bracket surrounding the actuator rod, as described further below, generally needs to be regularly, e.g. every 200 hours of flight, checked and adjusted.

Access to these fasteners is, however, often difficult. The checking and adjusting may require disassembly of the entire actuator and may require parts of the assembly around the lock nut to be discarded and replaced. Further, components of the lock nut may be such as to create FOD which can cause damage to the actuator assembly. This is particularly a problem in safety critical assemblies such as in aircraft. For an actuator of a helicopter rotor, for example, when a lock nut needs to be checked and adjusted to maintain the required torque, the actuator assembly needs to be dismounted and sent for maintenance. The assembly then needs to be disassembled such that the lock nut can be adjusted.

There is a need for an actuator assembly in which the torque of a lock nut can be checked and adjusted in situ—i.e.

without the need to dismount the actuator from the helicopter and send it away for maintenance—in in which the risk of FOD is reduced.

SUMMARY

According to the disclosure, there is provided a lock nut assembly for an actuator, the lock nut assembly comprising a nut configured to be mounted to a bracket of the actuator for axial movement relative to the bracket, and a lock nut retaining and release mechanism configured to be fixedly mounted to the bracket and axially movable between a first engaged position in which the lock nut retaining and release mechanism engages with the nut to prevent rotation of the nut and a second unlocked position in which the lock nut retaining and release mechanism is not engaged with the nut and the nut can be rotated relative to the bracket.

Also provided is an actuator assembly and a rotor.

BRIEF DESCRIPTION

Examples according to the disclosure will now be described in detail with reference to the drawings. It should be noted that variations are possible within the scope of the claims and the description is for the purposes of explanation only.

DETAILED DESCRIPTION

Figure 1:
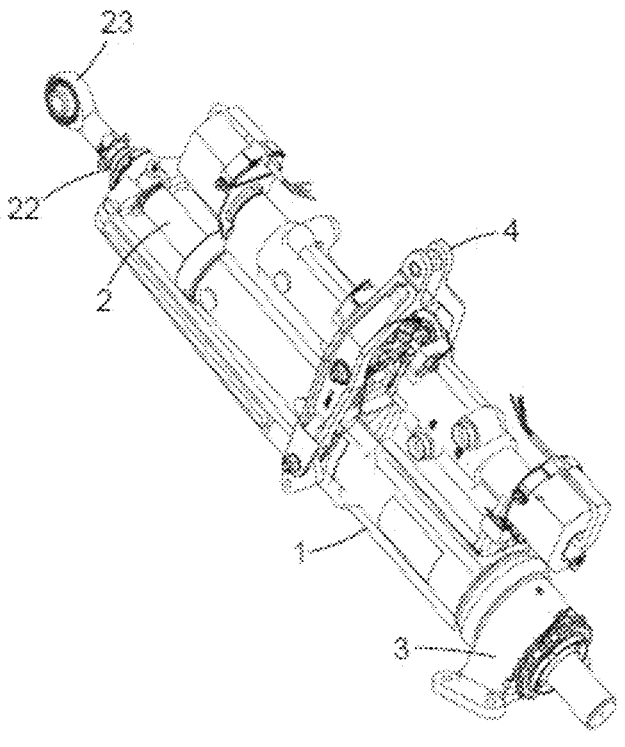
FIG. 1 shows a convention servo actuator for use, for example, for controlling a helicopter rotor.

FIG. 1 shows a typical actuator assembly as used e.g. for controlling the main rotor of a helicopter. The actuator can, however, also be used in other applications.

Such actuators are well-known and will not be described in extensive detail here but, in short, the assembly has a housing 1 in which is mounted an actuator piston or rod 2 for axial movement A relative to the housing 1. The rod has a first end (not seen here) for connection to the actuator drive assembly (also not shown) and a second end 22 for connection e.g. via an eye connector 23, to the rotor (or other part to be controlled by the actuator). The first end of the rod 2 is located inside a bracket 3 which also, as is well known, includes bearings to allow rotation of the rod relative to the bracket. The bracket is configured to be attached, e.g. via a flange 33 through which fasteners may be fastened, to a stationary part such as a fixed part of the helicopter body. A connector 4 extends from the bracket which is configured to connect to the pilot controls (not shown).

Figure 2:
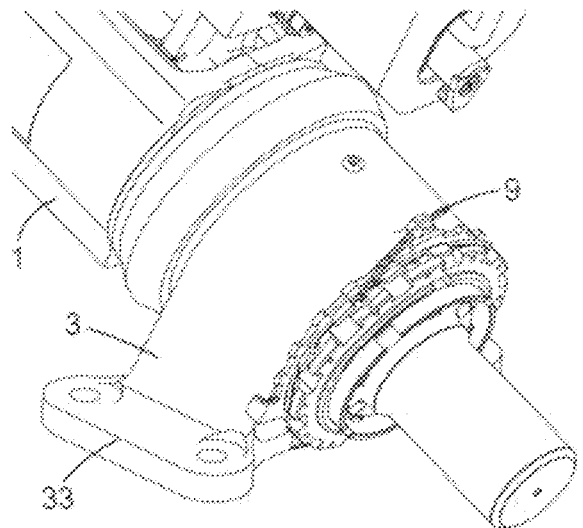
FIG. 2 is a close up view of a part of the actuator of FIG. 1.
Figure 3:
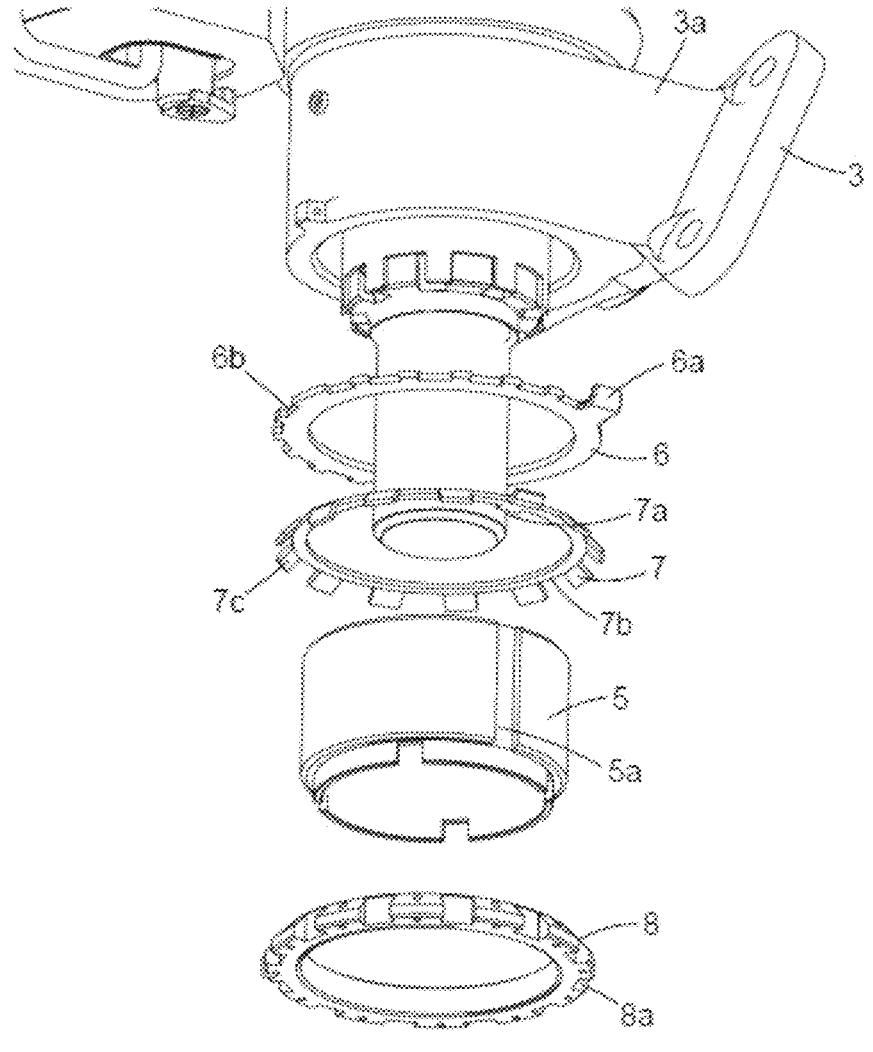
FIG. 3 is an exploded view of the lock nut parts within the bracket of the actuator of FIGS. 1 and 2.
Figure 4:
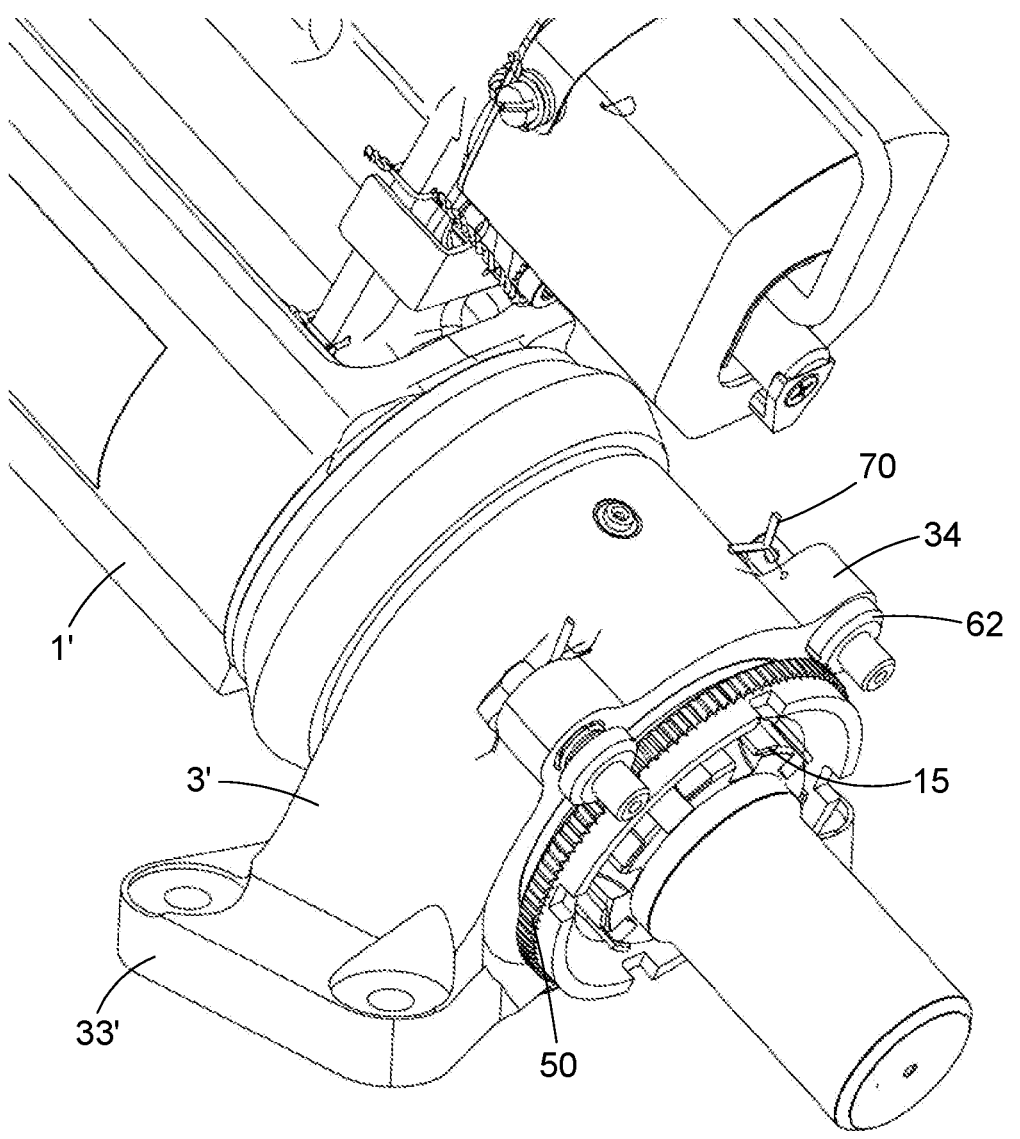
FIG. 4 is a view of an example of an actuator assembly according to the disclosure and also shows a detail in enlarged view.
Figure 4A:
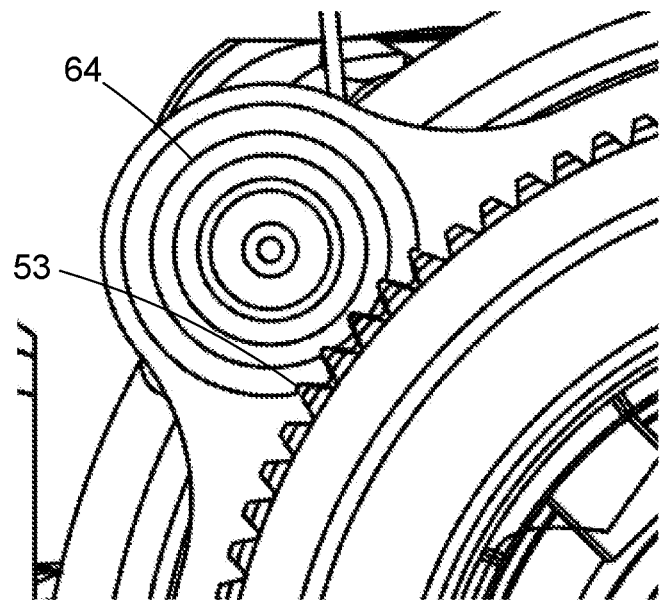
FIG. 4A shows the pin engagement feature of FIG. 4 in close up.

Inside the bracket 3 is provided a lock nut 5 for securing the actuator rod axially and also to ensure the required breakaway torque for the ball bearing. The break-away torque is the initial torque that has to be provided to start rotation of the bearing relative to the bracket. The break-away torque is necessary to prevent freeplay in the system—i.e. to prevent undesired rotation of the actuator rod that has not been commanded by pilot input. As will be described further below, the ball bearing is provided to rotate within races defined by rings around the actuator piston between the piston and the bracket. The lock nut 5 is tightened so as to provide an axial force on the race rings to ensure that there is some friction between the ball bearing and the bracket. This friction is only overcome when a torque exceeding the break-away torque is provided to the bearing, then allowing the ball bearing to rotate relative to the bracket. Until sufficient torque is applied, the bearing will not rotate relative to the bracket. It is important, therefore, that the lock nut (which is threadedly mounted to, and inside, the bracket) is tightened sufficiently to maintain the break-away torque. This needs to be checked regularly (e.g. every 200 flight hours) and the lock nut needs to be regularly tightened e.g. using a torque tool or a wrench. In the conventional assembly as shown in FIGS. 1 to 3, the lock nut is secured in the bracket by means of a series of retaining rings and washers 6, 7, 8. Washer 7 has an internal tooth 7*a* which engages in a slot 5*a* in the lock nut 5. Once engaged, the washer needs to be pushed against washer 6 and the bracket. A locking ring 8 is then screwed onto the lock nut 5 and tightened until the washers 6,7 cannot move and a minimum locking torque is reached. After initial assembly, the locking ring 8 needs to be screwed until a slot 8*a* in the ring 8 is correctly aligned with a tab 7*b* on the washer. Tabs 6*a* on the the washer 6 are then bent relative to the bracket lateral surfaces 3*a* and a tab 7*c* on washer 7 is bent with the washer slot 6*b* and tab 7*b* is bent with a slot 8*a* in locking ring 8.

Often, additional retention is provided by means of a retaining wire 9 secured to the exterior of the bracket 3 for redundancy.

Generally, in safety critical applications, re-use of deformable components is not permitted, and scrap from locking wires increases the risk of FOD in the system. Because of this, the rings/washers around the lock nut in the conventional systems are single-use parts that will be damaged when the have to be removed to allow the lock nut to be tightened. Thus, to check and adjust the torque provided by the lock nut in such a system, the entire assembly has to be dismounted, the rings/washers removed (and discarded), the nut torque checked (e.g. with a torque tool) and adjusted e.g. with a wrench. New rings/washers need to be mounted around the adjusted nut and the assembly can then be remounted to the helicopter. This is clearly time and cost intensive and increases the down time of the helicopter.

The present disclosure provides a new lock nut assembly that enables simplified, and in situ (e.g. performed on the upper deck of the helicopter), checking and adjusting of the torque provided by the nut without the risk of introducing FOD. The assembly of this disclosure replaces the lock nut and rings and washers of the known assembly with a modified lock nut assembly as described below, by way of example, with reference to FIGS. 4 to 7.

The main parts of the actuator assembly, namely the actuator rod 2', the connector 4' and the ball bearing 10 and races 12 are all as in the conventional actuator assembly. In summary, the actuator assembly includes an actuator piston 20 (here comprising an outer rod 2' and an inner rod 2") for axial movement, responsive to an input command via the connector 4', within the assembly housing 1'. The first end 21' of the actuator rod 2' is attached e.g. by fasteners 15, to and for rotation about the rod axis A' with the connector 4' response to the control commands from e.g. the pilot.

The first end 21' and the connection between the actuator rod and the connector, is within a bracket 3' which is configured to be mounted e.g. via a flange 33', to a stationary part e.g. part of the helicopter body.

A ball bearing 10 is provided between the actuator rod 2' and the bracket 3' to allow rotation of the actuator rod 2' relative to the bracket 3'. The ball bearing is provided in races 12 formed, here, by two rings 12.

As mentioned above, the ball bearing and the races are configured relative to the actuator rod and the bearing such that a friction is provided by the rings between the ball bearing and the bracket, such that a torque exceeding a predetermined break-away torque needs to be applied to the bearing (by a rotational force applied to the actuator rod 2') before the ball bearing, and hence the actuator rod 2', is able to rotate relative to the bracket. Until the applied torque exceeds the break-away torque, the friction provided by the race rings 12 prevents the actuator rod rotating relative to the bracket.

This friction is provided by means of the lock nut 50 being tightened to a predetermined extent against the race rings 12 in the axial direction.

Over time, the lock nut may loosen and/or may need to be tightened due to wear, vibration etc. in the system to ensure the break-away torque is maintained, otherwise, the actuator rod may be able to freely rotate with respect to the bracket. This can lead to component and system damage and can have catastrophic consequences.

The lock nut assembly of the disclosure, described further below, allows the lock nut torque to be easily checked and, if necessary, the lock nut to be tightened.

The lock nut assembly comprises two main parts: a lock nut 50 and a lock nut retaining and release mechanism 60. The lock nut 50 comprises a nut arranged to be mounted between the actuator rod and the bracket to apply torque to the ball bearing races 12 and to be rotatable relative to the bracket to move relative to the bracket in the axial direction to adjust the torque applied by the nut to the races 12. In one example, the nut 50 is threadedly attached to the bracket 3'. The nut has a first end 51 that abuts against the races 12 inside the bracket and a second end 52 extending outside of the bracket. The second end 52 is provided around its periphery with engaging means e.g. splines 53.

The lock nut retaining and release mechanism 60 is mounted to the bracket 3' and comprises an axially movable pin, being movable axially relative to the bracket 3' between an engaged position, in which the pin engages with the engaging means 53 of the nut 50 to prevent rotation of the nut relative to the bracket (described further below), and an unlocked position in which the pin does not engage with the nut and the nut can be rotated relative to the bracket.

Figure 5:
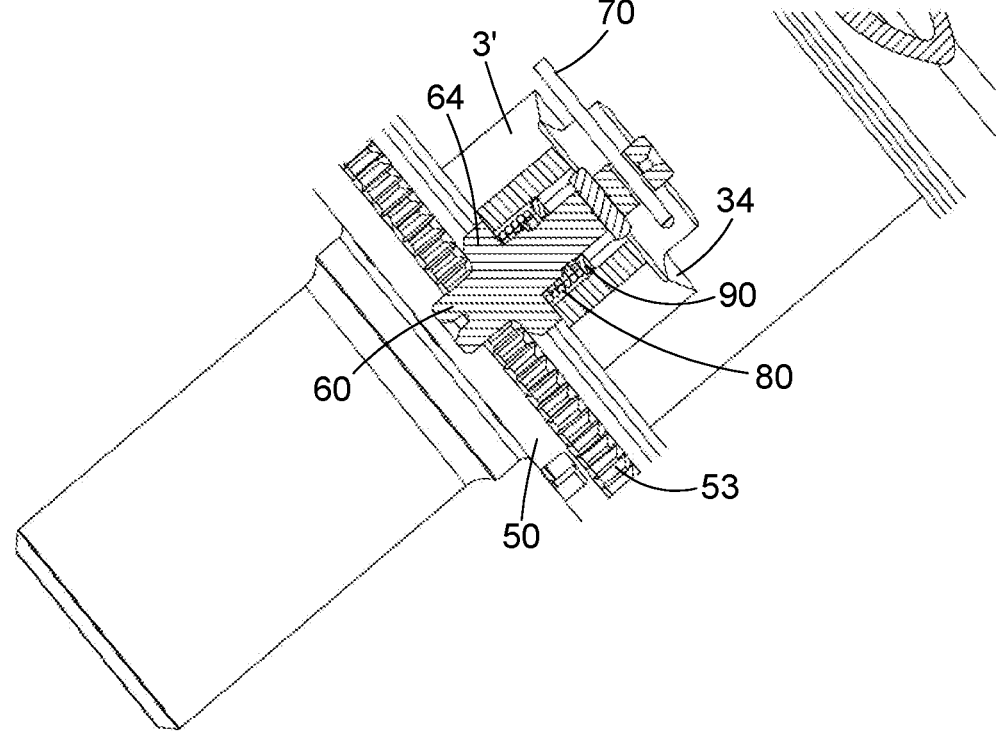
FIG. 5 shows the lock nut locking feature of the example of FIG. 4.

The structure of the lock nut retaining and release mechanism 60 will be described in further detail with particular reference to FIG. 5. The lock nut retaining and release mechanism 60 has a main pin body 61 having a first portion 62 extending axially from the bracket 3' and configured to be grasped or pushed by a user to move the pin axially relative to the bracket between the unlocked position and the engaged position. The main pin body 61 also has a second portion 63 arranged to be secured to the bracket e.g. in the example shown, the second portion fits through a flange 34 provided on the bracket and is secured by a securing pin 70 to prevent the pin being completely removed from the bracket during its axially movement between the engaged and the unlocked positions. The lock nut retaining and release mechanism 60 also includes a spring 80 to bias the pin relative to the bracket 3'. A radially extending lip 64 is provided between the first portion and the spring 80. The lock nut retaining and release mechanism 60 is mounted relative to the nut 50 such that the engaged position, the lip engages with the engaging means of the nut. The spring force is such that the lock nut retaining and release mechanism 60 is axially biased such that the lip engages with the nut—i.e. the spring is configured to bias the lock nut retaining and release mechanism 60 to the engaged position.

Figure 6:
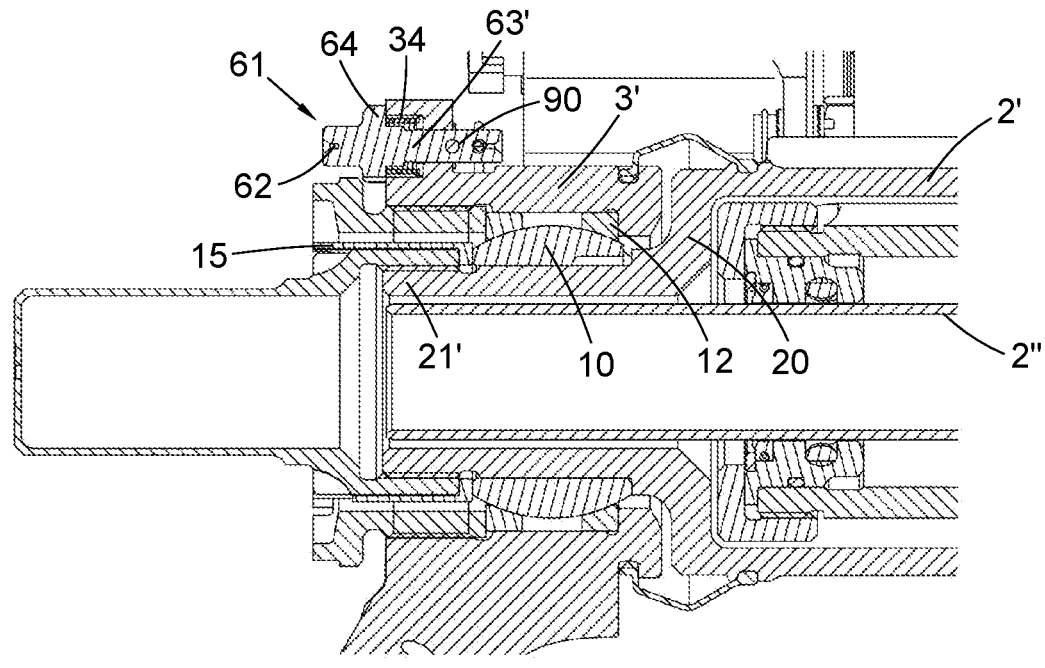
FIG. 6 shows the assembly of FIGS. 4 and 5 in an unlocked position.

The function of the lock nut assembly will now be described with particular reference to FIGS. 6 and 7.

Figure 7:
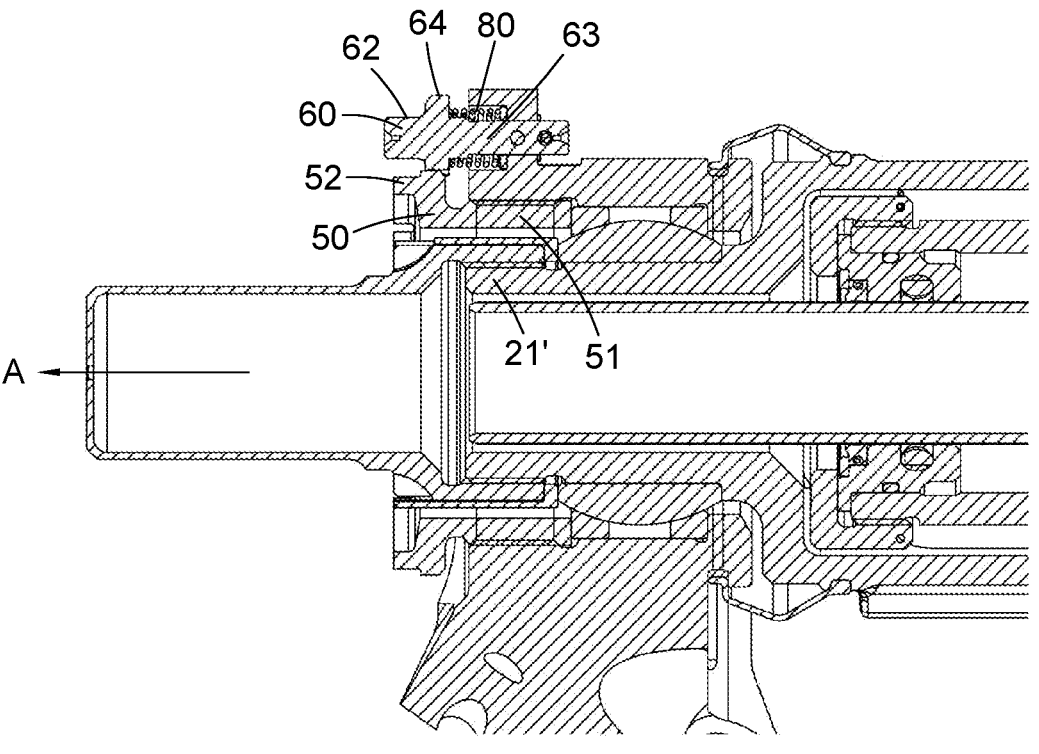
FIG. 7 shows the assembly of FIGS. 4 and 5 in a locked position.

In the default state, with the spring 80 in its relaxed state, the lip 64 of the pin engages with the splines 53 of the nut 50 as shown in FIG. 7. This locks the nut with respect to the bracket such that the nut cannot be rotated relative to the bracket. The axial position of the nut is such as to provide the break-away torque as described above so that the actuator rod is only able to rotate relative to the bracket when the applied rotational torque exceeds the break-away torque. The assembly remains in this engaged state during normal use to provide the desired actuator operation.

As mentioned above, the setting of the nut needs to be regularly checked to ensure that it continues to provide the necessary torque. To do this, using the assembly of the disclosure, all that needs to be done is to disengage the nut 50 from the lock nut retaining and release mechanism 60 by axially pushing against the first portion of the main pin body to apply a force against the bias of the spring 80. The pin is then moved axially relative to the bracket out of engagement with the nut, as shown in FIG. 6. The nut is then able to be tightened relative to the bracket and the races of the bearing, by rotation (e.g. using a wrench or other suitable tool) until the desired torque is achieved. Tightening of the nut causes it to apply an axial force to the races 12 which causes then to push radially outwards into frictional engagement with the bracket. Once the desired torque is reached to achieve the friction needed for the break-away torque, the user removes the force acting against the spring 80 and the spring relaxes to move the lock nut retaining and release mechanism 60 back to the engaged position (FIG. 7).

In this example, it is important that the pin of the lock nut retaining and release mechanism 60 is only able to move axially but is not able to rotate relative to the bracket. This can be achieved by means of a rotation stop mechanism. In the example shown this may be in the form of a rotation stop pin 90 on the second portion of the pin, that secures in a detent or recess in the bracket (e.g. in the flange 63).

The lock nut retaining and release mechanism 60 may only have a single pin or may comprise two or more pins mounted at different locations around the bracket to engage with multiple peripheral locations on the second end of the nut 50.

As mentioned above, this assembly allows the torque of the lock nut to be easily checked and adjusted without having to demount and disassembly the entire actuator assembly. The lock nut assembly is simple and compact and does not add to the overall envelope of the actuator assembly, and is robust and secure, even in harsh and high vibration environments and under high loads.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this speci-fication, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A lock nut assembly for an actuator, the lock nut assembly comprising:

a nut configured to be mounted to a bracket of the actuator for axial movement relative to the bracket, the nut including an external thread for threadedly attaching the nut to the bracket; and a lock nut retaining and release mechanism configured to be fixedly mounted to the bracket and axially movable between a first engaged position in which the lock nut retaining and release mechanism engages with the nut to prevent rotation of the nut and a second unlocked position in which the lock nut retaining and release mechanism is not engaged with the nut and the nut can be rotated relative to the bracket;

wherein tightening the nut onto the bracket applies an axial force to a bearing race, thereby pushing the bearing race radially outwardly into frictional engage-ment with the bracket;

wherein the nut includes an engaging means; and wherein the lock nut retaining and release mechanism further comprises:

an axially moveable pin which, in the first engaged position engages with the engaging means and in the second unlocked position does not engage with the engaging means.

2. The lock nut assembly of claim 1, wherein the engaging means comprises splines around the nut.

3. The lock nut assembly of claim 2, wherein the pin comprises a radially extending lip configured to engage with the splines in the engaged position.

4. The lock nut assembly of claim 1, wherein the pin comprises a first portion extending axially from the bracket to be contacted by a user, and a second portion to be secured to the bracket.

5. The lock nut assembly as claimed claim 1, further comprising a spring between the lock nut retaining and release mechanism and the bracket, to bias the lock nut retaining and release mechanism to the engaged position.

6. An actuator assembly comprising:

an axially extendable actuator rod, and a lock nut assem-bly as claimed in claim 1, wherein the actuator rod has a first end for connection to a load and a second end arranged to be mounted in the bracket via the bearing to allow rotation of the rod relative to the bracket;

wherein the nut is arranged to apply torque to the bear-ings.

7. The assembly of claim 6,
wherein the bracket is provided with a flange to receive the lock nut retaining and release mechanism.

8. The assembly of claim 7, further comprising:
a securing pin to secure the lock nut retaining and release mechanism in the flange.

9. The assembly of claim 7, further comprising:
a rotation stop pin located between the lock nut retaining and release mechanism and the flange to prevent rotation of the lock nut retaining and release mechanism relative to the flange.

10. A rotor having rotor blades and including an actuator assembly as claimed in claim 6 for adjustment of the rotor blades.

11. The rotor of claim 10, being a helicopter rotor.

12. The rotor of claim 11, being a helicopter main rotor.

13. A lock nut assembly for an actuator, the lock nut assembly comprising:
a nut configured to be mounted to a bracket of the actuator for axial movement relative to the bracket, the nut including an external thread for threadedly attaching the nut to the bracket; and
a lock nut retaining and release mechanism configured to be fixedly mounted to the bracket and axially movable between a first engaged position in which the lock nut retaining and release mechanism engages with the nut to prevent rotation of the nut and a second unlocked position in which the lock nut retaining and release mechanism is not engaged with the nut and the nut can be rotated relative to the bracket;
wherein tightening the nut onto the bracket applies an axial force to a bearing race, thereby pushing the bearing race radially outwardly into frictional engagement with the bracket;
further comprising a spring between the lock nut retaining and release mechanism and the bracket, to bias the lock nut retaining and release mechanism to the engaged position.

14. An actuator assembly comprising:
an axially extendable actuator rod, and
a lock nut assembly comprising
a nut configured to be mounted to a bracket of the actuator for axial movement relative to the bracket, the nut including an external thread for threadedly attaching the nut to the bracket; and
a lock nut retaining and release mechanism configured to be fixedly mounted to the bracket and axially movable between a first engaged position in which the lock nut retaining and release mechanism engages with the nut to prevent rotation of the nut and a second unlocked position in which the lock nut retaining and release mechanism is not engaged with the nut and the nut can be rotated relative to the bracket;
wherein tightening the nut onto the bracket applies an axial force to a bearing race, thereby pushing the bearing race radially outwardly into frictional engagement with the bracket;
wherein the actuator rod has a first end for connection to a load and a second end arranged to be mounted in the bracket the bearing to allow rotation of the rod relative to the bracket;
wherein the nut is arranged to apply torque to the bearing, wherein the bracket is provided with a flange to receive the lock nut retaining and release mechanism;
wherein the actuator assembly further comprises:
a rotation stop pin located between the lock nut retaining and release mechanism and the flange to prevent rotation of the lock nut retaining and release mechanism relative to the flange.

* * * * *